US008305542B2

(12) United States Patent
Kang et al.

(10) Patent No.: US 8,305,542 B2
(45) Date of Patent: *Nov. 6, 2012

(54) THIN FILM TRANSISTOR ARRAY SUBSTRATE WITH IMPROVED TEST TERMINALS

(75) Inventors: Dong Woo Kang, Gumi-si (KR); Soung Yeoul Eom, Gumi-si (KR); Bong Chul Kim, Daegu (KR); Ki Soub Yang, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/180,287

(22) Filed: Jul. 11, 2011

(65) Prior Publication Data

US 2011/0287561 A1   Nov. 24, 2011

Related U.S. Application Data

(62) Division of application No. 11/479,860, filed on Jun. 29, 2006, now Pat. No. 7,999,901.

(30) Foreign Application Priority Data

Aug. 30, 2005   (KR) .................. 10-2005-0080149

(51) Int. Cl.
*G02F 1/1345* (2006.01)
(52) U.S. Cl. ......... 349/151; 349/149; 349/187; 349/192
(58) Field of Classification Search .................. 349/149, 349/151, 187, 192; 345/104
See application file for complete search history.

(56) References Cited

U.S. PATENT DOCUMENTS

| 6,128,051 | A | 10/2000 | Kim et al. |
|---|---|---|---|
| 6,429,908 | B1 | 8/2002 | Lim |
| 7,999,901 | B2 * | 8/2011 | Kang et al. ............ 349/151 |
| 2001/0030635 | A1 | 10/2001 | Kodate et al. |
| 2002/0089614 | A1 | 7/2002 | Kim |

FOREIGN PATENT DOCUMENTS

| KR | 1020000014516 A | 3/2000 |
|---|---|---|
| KR | 1020050011873 A | 1/2005 |

OTHER PUBLICATIONS

Office Action issued in corresponding Korean Patent Application No. 10-2005-0080149, mailed Oct. 10, 2011.

* cited by examiner

*Primary Examiner* — Michael Caley
(74) *Attorney, Agent, or Firm* — Brinks Hofer Gilson & Lione

(57) ABSTRACT

A thin film transistor array substrate comprises thin film transistors and pixel electrodes formed at respective pixels that are defined by gate lines and data lines that orthogonally intersect each other. The thin film transistor array substrate further comprises a plurality of gate pad units that group a plurality of gate pads extended from the gate lines, and a plurality of data pad units that groups a plurality of data pads extended from the data lines. The thin film transistor array substrate further includes a plurality of gate test terminals connected to the gate pad units and beside at least one side of the respective gate pad units, and a plurality of data test terminals connected to the data pad units and located beside at least one side of the respective data pad units.

42 Claims, 7 Drawing Sheets

THIN FILM TRANSISTOR ARRAY SUBSTRATE WITH IMPROVED TEST TERMINALS

The present patent document is a divisional of U.S. patent application Ser. No. 11/479,860, filed Jun. 29, 2006, which claims priority to Korean Application No. 10-2005-0080149 filed on Aug. 30, 2005, which are hereby incorporated by reference.

FIELD

The present invention relates to a method for manufacturing a liquid crystal display device, and more particularly, to a method for manufacturing a liquid crystal display device for preventing the delay of signals in a vision auto probe (VAP) test.

BACKGROUND

As well known, liquid crystal display (LCD) devices have a high contrast ratio and low energy consumption, and are suitable to display gray scale images and moving images. Thus, LCD devices are most widely used as a representative example of flat panel display devices, and are being actively developed.

In particular, because of a lot of outstanding advantages such as thinness, light weight, and considerably reduced energy consumption as compared to cathode ray tubes (CRTs), various applications of LCD devices are possible in association with not only ultra-thin display devices of wall mounted TV sets, but also monitors of notebook computers that use a battery as a power source. Accordingly, LCD devices are highlighted as next-generation display devices.

Such an LCD device generally includes a thin film transistor array substrate in which thin film transistors and pixel electrodes are formed at respective pixel defined by gate lines and data lines, a color filter layer array substrate having a color filter layer and common electrode, and a liquid crystal layer interposed between the two substrates. In the liquid crystal display device having the above described configuration, liquid crystal molecules of the liquid crystal layer are rearranged when a voltage is applied to electrodes. The quantity of light passing through the liquid crystal layer is regulated based on the degree of rearrangement of the liquid crystal molecules, to display an image.

In this case, both the color filter layer array substrate and the thin film transistor array substrate are bonded to each other by a sealant such as epoxy resin. The thin film transistor array substrate is connected to drive circuits on a printed circuit board (PCB).

Specifically, as shown in FIG. 1, the thin film transistor array substrate 10 is divided into an active region 10a at the inside of a dotted line, the active region being an image display region, and a pad unit region 10b at the outside of the dotted line. The active region 10a includes a plurality of gate lines 61 and data lines 62 orthogonally intersecting each other to define unit pixels, and thin film transistors (TFTs) formed at intersections of the gate lines 61 and data lines 62. The unit pixels include pixel electrodes 70, respectively. The pixel electrodes 70 are connected to the respective TFTs, to display an image by switching of the respective TFTs.

The pad unit region 10b includes gate pads 61a and data pads 62a which are extended from the gate lines 61 and data lines 62, respectively. The gate pads 61a and data pads 62a are connected to external drive circuits, respectively, by interposing gate drive ICs and data drive ICs, to receive various control signals and data signals. The external drive circuits are integrated on a board, more particularly, a printed circuit board, and are adapted to produce the various control signals and data signals required to drive the LCD device.

Specifically, the gate pads 61a serve to apply scan signals in sequence to the plurality of gate lines arranged in the active region, and the data pads 62a serve to apply data signals in sequence to the plurality of data lines arranged in the active region.

When the gate lines receive the scan signals via the gate pads, and thus the TFTs that are connected to the gate lines are turned on, the data signals applied from the data pads are transmitted to the respective pixel electrodes, so as to display an image.

Prior to being bonded to the color filter layer array substrate, the above described thin film transistor array substrate must be subjected to a mass production system (MPS) test for testing various defects such as line defects and point defects. In the MPS test, a signal voltage is applied to the thin film transistor array substrate via the gate pads and data pads that are connected to the gate lines and data lines in the active region, respectively, to determine whether or not the thin film transistor array substrate has defects.

For example, to perform a vision auto probe (VAP) test for testing defects of the respective unit pixels, probes, to which predetermined signals are applied, are accurately aligned with the gate pads and data pads, such that the gate pads receive the associated predetermined signals and the data pads receive the associated predetermined signals. In accordance with the reception results, it can be confirmed whether or not a desired image is displayed on the respective unit pixels. In this case, a VAP test apparatus is divided into a panel having the probes for applying the predetermined signals to the gate pads and a panel having the probes for applying the predetermined signals to the data pads. The probes are fabricated to be accurately aligned with the gate pads and data pads, respectively.

However, the conventional liquid crystal display device has the following problems.

The plurality of gate pads and data pads, which are extended from the gate lines and data lines, are divided into several groups. With this arrangement, however, widths between the gate pads and between the data pads are narrow, and each of the gate pads and data pads has a small size, making it difficult for the probes to come into accurate contact with the gate pads and data pads. When the probes fail to contact at accurate positions, it is impossible to apply the predetermined signals to the gate pads and data pads, and therefore, defects of pixels cannot be confirmed.

SUMMARY

Accordingly, the present invention is directed to a liquid crystal display device that substantially obviates one or more problems due to limitations and disadvantages of the related art.

A thin film transistor array substrate comprises thin film transistors and pixel electrodes formed at respective pixels that are defined by gate lines and data lines intersecting each other. The thin film transistor array substrate further comprises a plurality of gate pad units obtained by grouping a plurality of gate pads that are extended from the gate lines and a plurality of data pad units obtained by grouping a plurality of data pads that are extended from the data lines. The thin film transistor array substrate further includes test terminal units comprising at least one of gate test terminal units or data test terminal units, wherein the gate test terminal units include a plurality of gate test terminals and are provided adjacent to at least one side of the gate pad units to be connected thereto, and the data test terminal units include a plurality of data test terminals and are provided adjacent to at least one side of the data pad units to be connected thereto.

That is, instead of directly aligning probes of a VAP test apparatus with the gate pad units and data pad units, the probes of the VAP test apparatus are brought into contact with the gate test terminals and data test terminals which are provided beside the respective gate pad units and data pad units to be connected thereto, so as to apply test signals to the gate pad units and data pad units.

A method of fabricating a thin film transistor array substrate comprises forming thin film transistors and pixel electrodes at respective pixels defined by gate lines and data lines that intersect each other and forming a plurality of gate pad units that group a plurality of gate pads extended from the gate lines. The method of fabricating a thin film transistor array substrate further comprises forming a plurality of data pad units that group a plurality of data pads extended from the data lines and forming test terminal units comprising at least one of gate test terminal units or data test terminal units, wherein the gate test terminal units include a plurality of gate test terminals and are provided adjacent to at least one side of the gate pad units to be connected thereto, and the data test terminal units include a plurality of data test terminals and are provided adjacent to at least one side of the data pad units to be connected thereto.

A method of testing a thin film transistor array substrate comprises providing a thin film transistor array substrate and applying test signals to at least one of the plurality of gate pads via the gate test terminals, or the plurality of data pads via the data test terminals.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
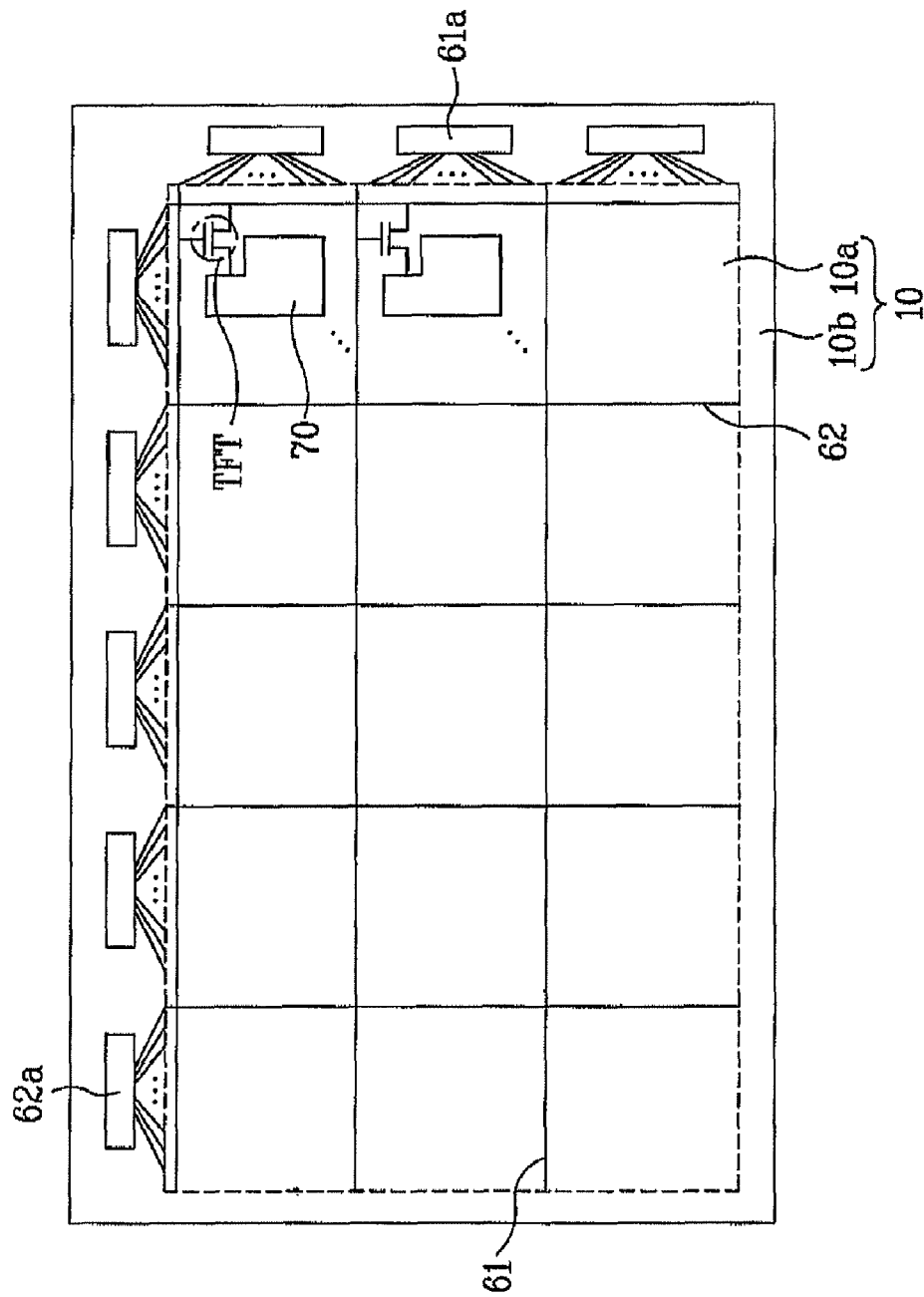
FIG. 1 is a plan view showing a conventional liquid crystal display device.
Figure 2:
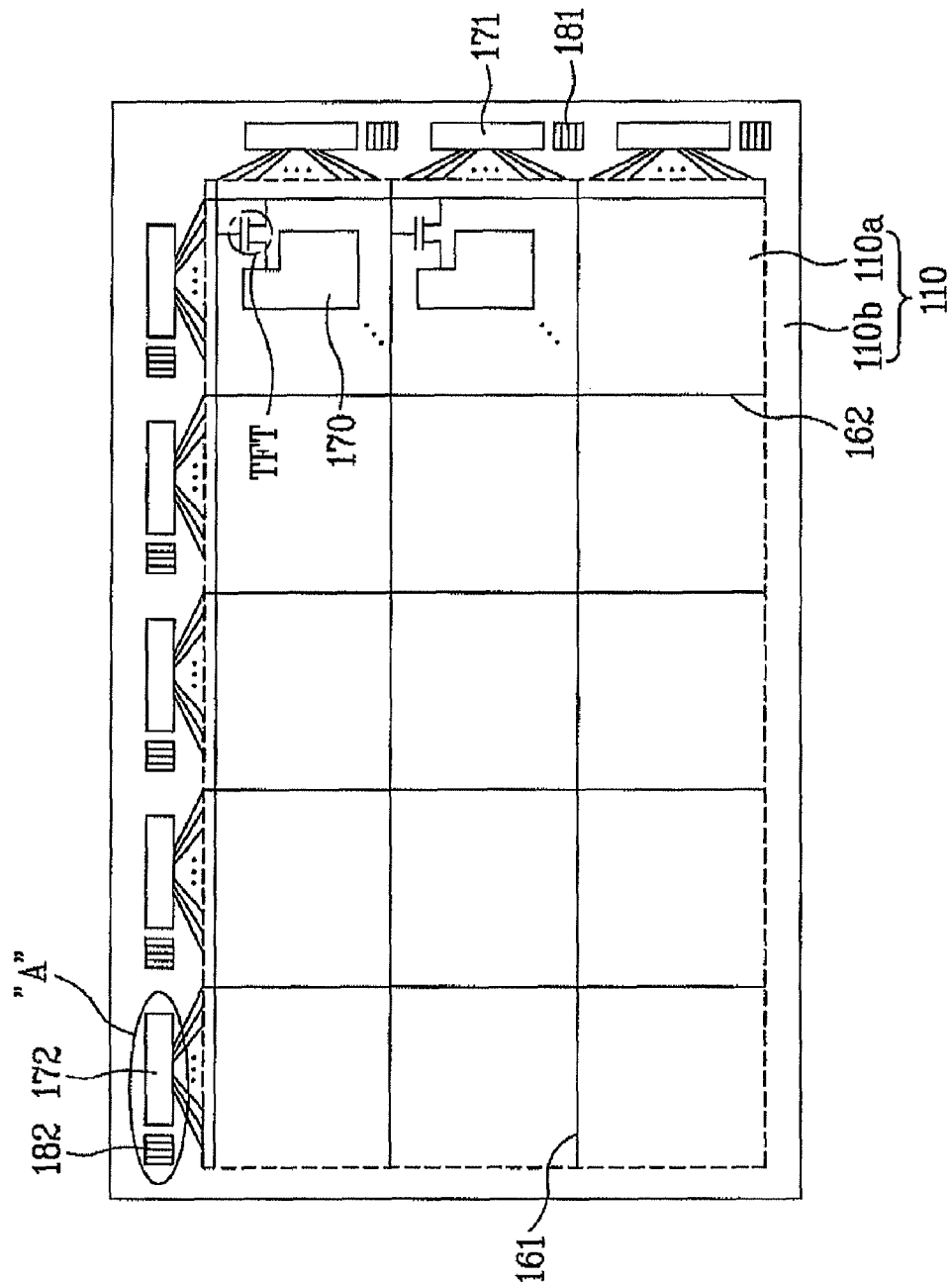
FIG. 2 is a plan view showing a liquid crystal display device in accordance with a first embodiment of the present invention.
Figure 3:
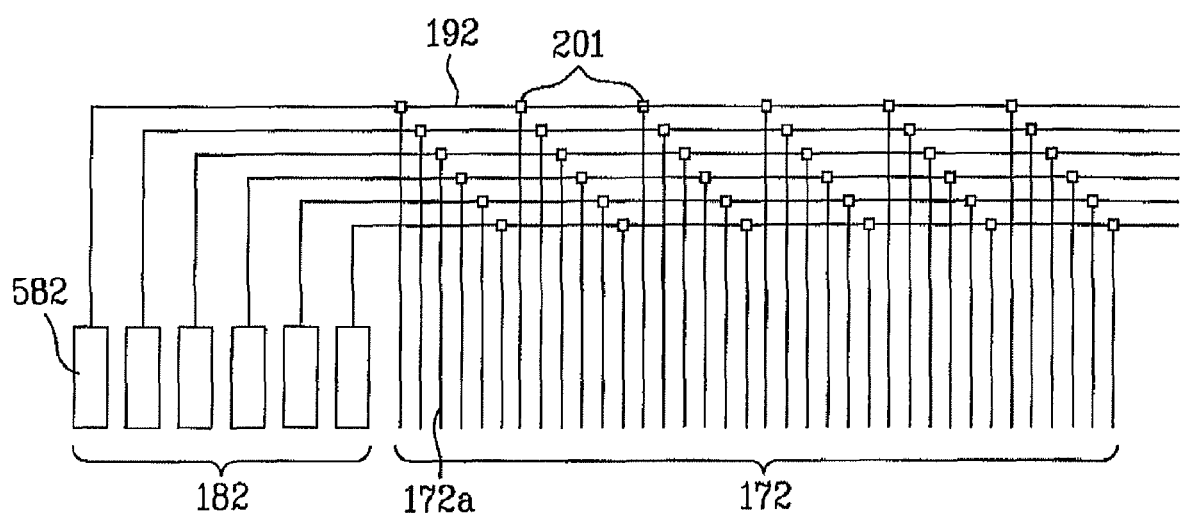
FIG. 3 is an enlarged plan view of oval "A" of FIG. 2.

FIG. 2 is a plan view showing a liquid crystal display device in accordance with a first embodiment of the present invention, and FIG. 3 is an enlarged plan view of oval "A" of FIG. 2.

As shown in FIG. 2, a thin film transistor array substrate 110 according to the present invention is divided into an active region 110a at the inside of a dotted line, the active region being an image display region, and a pad unit region 110b at the outside of the dotted line.

The active region 110a includes a plurality of gate lines 161 and data lines 162, orthogonally intersecting each other to define unit pixels. Thin film transistors (TFTs) are formed at intersections of the gate lines 161 and data lines 162. The unit pixels are formed with pixel electrodes 170, respectively. The pixel electrodes 170 are connected to the respective TFTs, to display an image in accordance with the switching of the respective TFTs. Each of the TFTs includes a gate electrode branched from the relevant gate line, a gate insulation film formed over the entire surface thereof including the gate electrode, an active layer formed on the gate insulation film at a position above the gate electrode, and source/drain electrodes formed at opposite ends of the active layer while being branched from the relevant data line.

The pad unit region 110b includes a plurality of gate pads and data pads extended from the gate lines 161 and data lines 162, respectively. The gate pads and data pads are divided into groups to form one or more gate pad units 171, each including the plurality of gate pads, and one or more data pad units 172, each including the plurality of data pads. In this case, the gate pad units and data pad units are connected to external drive circuits such that various control signals and data signals produced from the external drive circuits can be applied to the active region.

Prior to connecting the external drive circuits, it is desirable to test defects of a liquid crystal panel such as line defects and point defects. Thus, gate test terminals and data test terminals are connected to the gate pads and data pads, respectively, to apply a predetermined voltage to the gate pads and data pads.

Specifically, the gate test terminal unit 181 consisting of a number (n) of gate test terminals (here, letter "n" denotes a natural number more than 1) is provided at a side of each gate pad unit 171 such that the predetermined voltage is applied to the gate pad unit 171 via the gate test terminals in order to test defects of the associated pixel. In this case, each of the gate test terminals is indirectly connected to the associated gate pads through a gate terminal line that is integrally extended from a distal end of the gate test terminal.

That is, (mn+1)th gate pads of the gate pad unit are brought into contact with a first test terminal, (mn+2)th gate pads are brought into contact with a second test terminal, and (mn+3)th gate pads are brought into contact with a third test terminal Such a method, consequently, is characterized in that (mn+n)th gate pads of any one gate pad unit are brought into contact with an (n)th test terminal of the associated gate test terminal that is provided at a side of the gate pad unit (here, letter "m" denotes a natural number more than zero).

Similarly, the data test terminal unit 182 consisting of a number (f) of data test terminals 582 (here, letter "f" denotes a natural number more than 1) are provided at a side of each data pad unit 172 such that the predetermined voltage is applied to the data pad unit 172 via the data test terminals 582 in order to test defects of the associated pixel. In this case, each of the data test terminals is connected to the associated data pads through a data terminal line that is integrally extended from a distal end of the data test terminal That is, (kf+1)th data pads of the data pad unit are brought into contact with a first data test terminal, (kf+2)th data pads are brought into contact with a second data test terminal, and (kf+3)th data pads of any one data pad unit are brought into contact with a third data test terminal Such a method, consequently, is characterized in that (kf+f)th data pads are brought into contact with an (f)th data test terminal of the associated data test terminal that is provided at a side of the data pad unit (here, letter "k" denotes a natural number more than zero).

For example, as shown in FIG. 3, if six data test terminals 582 of any one data test terminal unit 182 are arranged at a side of one of the data pad units, and the data test terminals are connected to data terminal lines 192, respectively, each of the data pads is electrically connected to the associated data terminal line and data test terminal via an associated hole of first contact holes 201.

That is, first, second, third, fourth, fifth, and sixth data pads 172a of the data pad unit are brought into contact with the six data test terminals in sequence. Also, seventh, eighth, ninth, tenth, eleventh, and twelfth data pads are brought into contact with the six data test terminals in sequence. Similarly, thirteenth, fourteenth, fifteenth, sixteenth, seventeenth, and eighteenth data pads are brought into contact with the six data test terminals in sequence. In such a method, all data pads 172a of any one data pad unit 172 are brought into contact with the data test terminals of any one data test terminal unit 182 that are located at a side of the data pad unit.

In conclusion, the present invention is characterized in that probes of a VAP test apparatus are aligned with gate test terminal units and data test terminal units that are additionally provided at the thin film transistor array substrate, other than being directly aligned with the gate pads and data pads. This has the effect of preventing a test defect due to misalignment between the probes and pad electrodes, and achieving an enlargement of the gate test terminals and data test terminals, and resulting in a sufficient probe contact margin.

However, due to the fact that such a test terminal unit is provided only at one side of the pad unit, the greater the distance between the pad electrodes and the test terminals, the greater the delay of test signals due to a resistance based on the distance. This may make the results of the test inaccurate.

Figure 4:
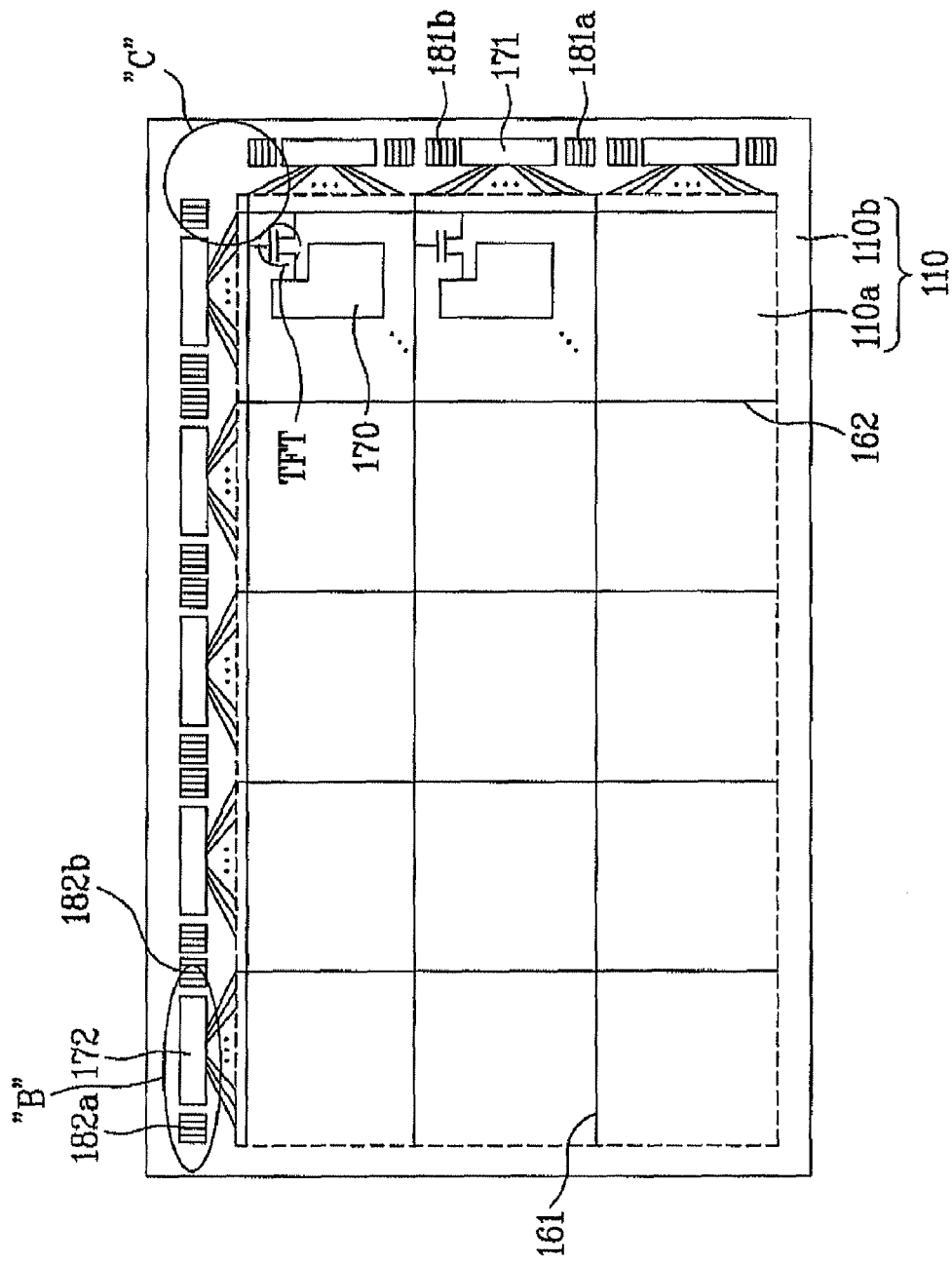
FIG. 4 is a plan view showing a liquid crystal display device in accordance with a second embodiment of the present invention.
Figure 5:
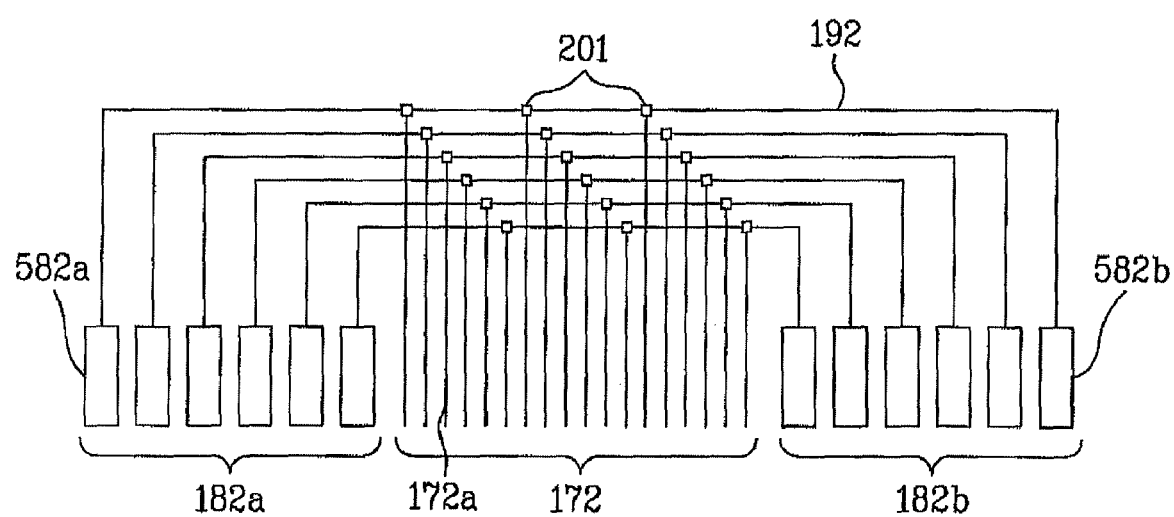
FIG. 5 is an enlarged plan view of oval "B" of FIG. 4.

Accordingly, it is desirable that two test terminal units be provided at opposite sides of the pad unit to apply a test voltage to the pad unit. FIG. 4 is a plan view showing a liquid crystal display device in accordance with a second embodiment of the present invention. FIG. 5 is an enlarged plan view of oval "B" of FIG. 4.

As shown in FIG. 4, in association with a plurality of gate pad units each consisting of a plurality of gate pads, first and second gate test terminal units 181a and 181b consisting of a number (n) of gate test terminals are provided at opposite sides of each gate pad unit 171, respectively (here, letter "n" denotes a natural number more than 1), such that a predetermined voltage is simultaneously applied via both the first gate test terminals and second gate test terminals in order to test defects of the associated pixel. In this case, the first and second gate test terminals are connected to the respective gate pads via gate terminal lines that are integrally formed with the gate test terminals.

That is, (mn+1)th gate pads of the gate pad unit 171 are brought into contact with the first gate test terminals in the first and second gate test terminal units, (mn+2)th gate pads of the gate pad unit 171 are brought into contact with the second gate test terminals in the first and second gate test terminal units, and (mn+3)th gate pads of the gate pad unit 171 are brought into contact with the third gate test terminals in the first and second gate test terminal units (here, letter "m" denotes a natural number more than zero).

Such a method, consequently, is characterized in that (mn+n)th gate pads of any one gate pad unit are brought into contact with (n)th gate test terminals in the associated first and second gate test terminal units that are provided at opposite sides of the gate pad unit. Further, it is characterized in that (n)th gate test terminals in the first and second gate test terminal units are integrally connected to each other via a single (n)th gate terminal line.

Similarly, in association with a plurality of data pad units each consisting of a plurality of data pads, a first data test terminal 182a consisting of a number (f) of first data test terminals 582a and a second data test terminal 182b consisting of a number (f) of second data test terminals 582b are provided at opposite sides of each data pad unit 172, respectively (here, letter "f" denotes a natural number more than 1), such that a predetermined voltage is simultaneously applied via both the first data test terminals 582a and second data test terminals 582b in order to test defects of the associated pixel. In this case, the first and second data test terminals are connected to the respective data pads via data terminal lines that are integrally extended from distal ends of the data test terminals.

That is, (kf+1)th data pads of the data pad unit are brought into contact with the first data test terminals in the first and second data test terminal units, (kf+2)th data pads of the data pad unit are brought into contact with the second data test terminals in the first and second data test terminal units, and (kf+3)th data pads of the data pad unit are brought into contact with the third data test terminals in the first and second data test terminal units (here, letter "k" denotes a natural number more than zero).

Such a method, consequently, is characterized in that (kf+f)th data pads of any one data pad unit are brought into contact with (f)th data test terminals in the associated first and second data test terminal units that are provided at opposite sides of the data pad unit. Further, it is characterized in that (f)th data test terminals in the first and second data test terminal units are integrally connected to each other via a single (f)th gate terminal line.

For example, as shown in FIG. 5, if six data test terminals 582a and six data test terminals 582b are arranged at opposite sides of one of the data pad units, respectively, and the data test terminals are integrally connected to the respective data terminal lines 192, each of the data pads is electrically connected to the associated data terminal line and data test terminal via one of the first contact holes 201.

That is, first, second, third, fourth, fifth, and sixth data pads 172a of the data pad unit are brought into contact with the six first data test terminals 582a and six second data test terminals 582b via the associated first contact holes 201 in sequence. Also, seventh, eighth, ninth, tenth, eleventh, and twelfth data pads are brought into contact with the six first data test terminals 582a and six second data test terminals 582b in sequence. Similarly, thirteenth, fourteenth, fifteenth, sixteenth, seventeenth, and eighteenth data pads are brought into contact with the six first data test terminals 582a and six second data test terminals 582b in sequence. In such a method, all data pads of any one data pad unit are brought into contact with the first and second data test terminals.

In this case, the first data test terminals in the first and second data test terminal units are integrally connected to each other via the first data terminal line, and the second data test terminals in the first and second data test terminal units are integrally connected to each other via the second data terminal line. In such a method, (f)th data test terminals in the first and second data test terminal units are integrally connected to each other by an (f)th data terminal line.

In conclusion, as a result of connecting two test terminals to a single pad to apply a test signal to each pad electrode via the two test terminals, the delay of test signals depending on a distance between the test terminals and the pad electrode can be minimized, resulting in a more accurate test.

Further, in a chip on glass (COG) manner wherein drive ICs are directly mounted on the TFT array substrate, more particularly, in a line on glass (LOG) manner wherein LOG lines are directly mounted on the TFT array substrate, the LOG lines must be formed even in corners of the substrate (circle "C" of FIG. 4). Accordingly, no gate test terminal unit and data test terminal unit can be formed in the region "C" in LOG manner.

The gate test terminals (including the gate terminal lines) and data test terminals (including the data terminal lines) as stated above are separated from the gate pads and data pads respectively in order to prevent a short circuit between the test terminals and pad electrodes. The individually formed gate and data test terminals are then electrically connected to the gate and data pads by use of connection patterns that are formed on an uppermost layer of the TFT array substrate.

Figure 6:
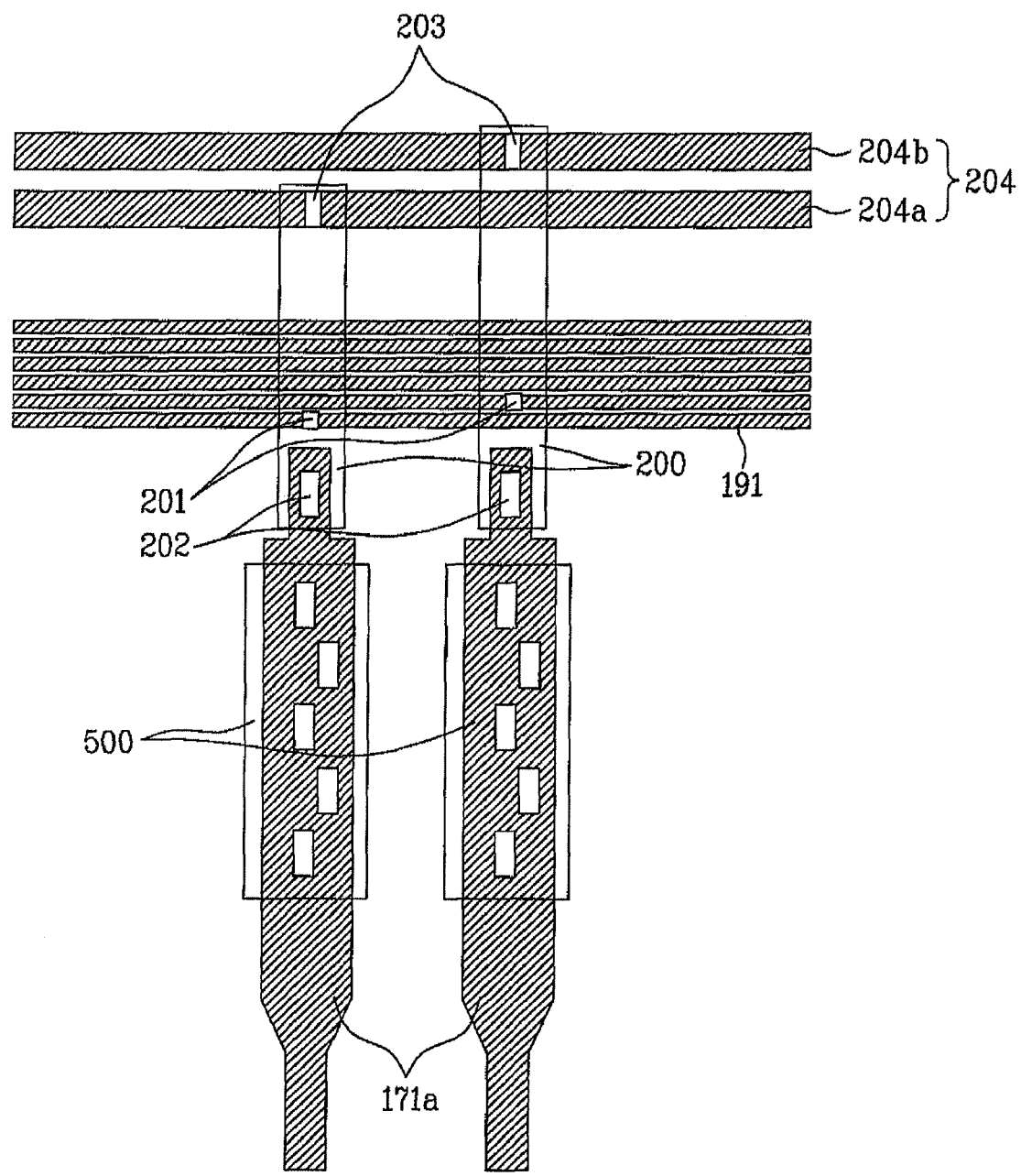
FIG. 6 is a plan view showing a gate pad unit in accordance with the present invention.
Figure 7:
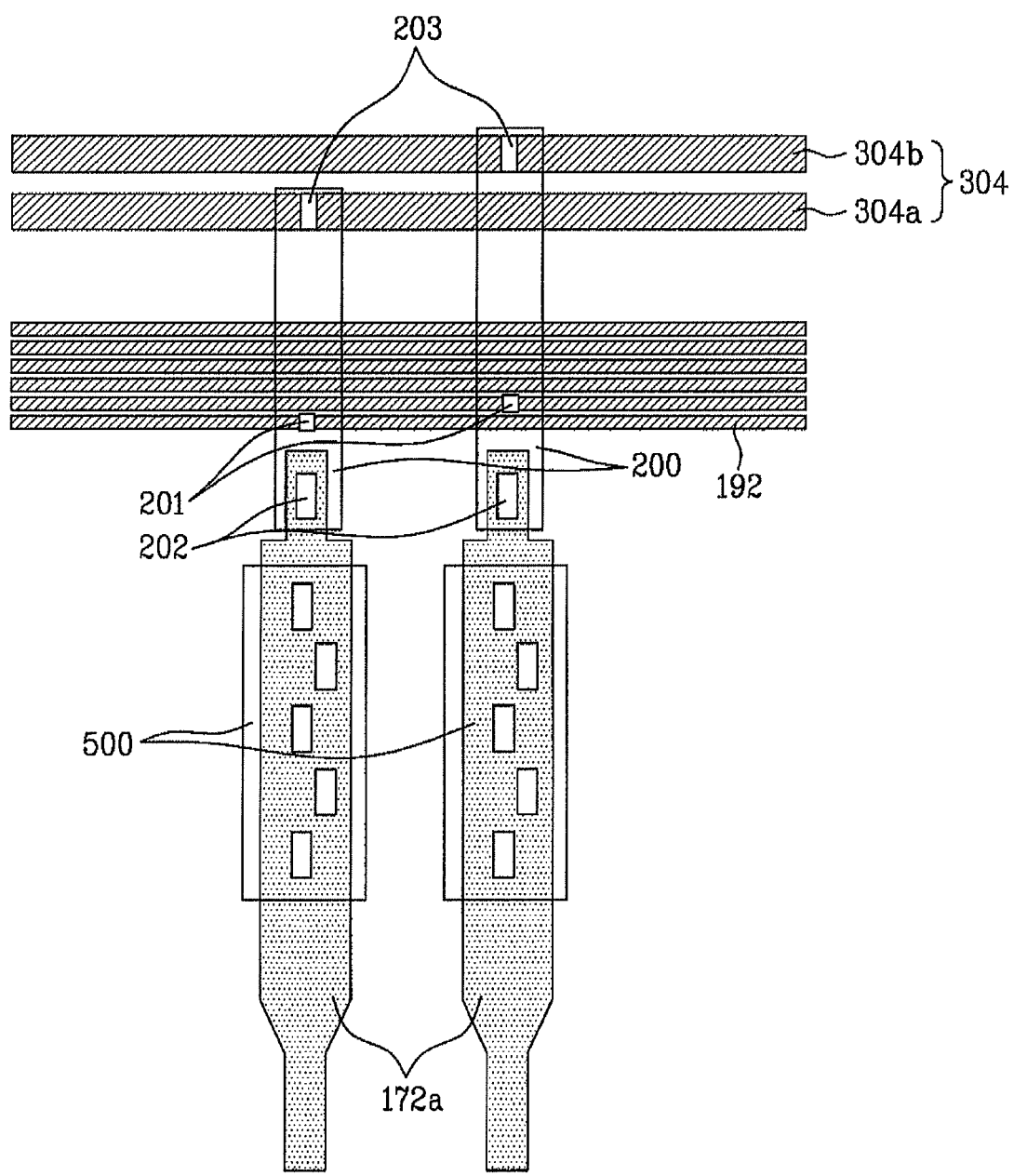
FIG. 7 is a plan view showing a data pad unit in accordance with the present invention.

FIG. 6 is a plan view showing a gate pad unit in accordance with the present invention. FIG. 7 is a plan view showing a data pad unit in accordance with the present invention.

Specifically, as shown in FIG. 6, the gate pads 171a are extended from distal ends of the gate lines (see reference numeral 161 of FIG. 2), and the gate terminal lines 191 are provided on the outside of the gate pads. The gate terminal lines 191 are integrally formed at distal ends thereof with test terminals, respectively. In this case, the connection patterns 200 are used for the contact between the gate terminal lines and the gate pads. Thus, the connection patterns 200 are electrically connected to the gate pads 171a via second contact holes 202 while being brought into contact with the gate terminal lines 191 via the first contact holes 201. The connection patterns 200 are formed in the same layer as pixel electrodes of the active region.

Meanwhile, gate shorting bars 204 are further provided on the outside of the gate terminal lines to be electrically connected to the gate pads. To connect the gate pads to the gate shorting bars, the connection patterns 200 are extended to the gate shorting bars 204 and are brought into contact with the gate shorting bars 204 via third contact holes 203. Generally, the gate shorting bars include a first gate shorting bar 204a to be connected to the gate pads corresponding to odd numbers, and a second gate shorting bar 204b to be connected to the gate pads corresponding to even numbers. The first and second gate shorting bars are used to detect whether or not the gate lines exhibit a short circuit by a difference of voltages applied to the gate lines.

The gate terminal lines 191 and gate shorting bars 204 may be formed in the same layer as the gate pads 171a. In this case, the first, second, and third contact holes 201, 202, and 203 are formed by removing an insulation film that is interposed between the gate line layer and the connection patterns. Generally, the gate line layer is made of AlNd having a low specific resistance, and therefore, can minimize an area occupied by the gate terminal lines.

Meanwhile, as shown in FIG. 7, the data terminal lines 192, which are integrally formed with the data test terminals, are electrically connected to the data pads 172a by use of the connection patterns 200. The data pads 172a are extended from distal ends of the data lines (see reference numeral 162 of FIG. 2) and the data terminal lines 192 are provided on the outside of the data pads. In this case, the connection patterns 200 are used for the contact between the data terminal lines and the data pads. Thus, the connection patterns 200 are electrically connected to the data pads 172a via the second contact holes 202 while being brought into contact with the data terminal lines 192 via the first contact holes 201. The connection patterns 200 are provided in the same layer as the pixel electrodes of the active region.

Data shorting bars 304 are further provided on the outside of the data terminal lines to be electrically connected to the data pads. To connect the data pads to the data shorting bars, the connection patterns 200 are extended to the data shorting bars 304 and are brought into contact with the data shorting bars 304 via the third contact holes 203. Generally, the data shorting bars include a first data shorting bar 304a to be connected to the data pads corresponding to odd numbers, and a second data shorting bar 304b to be connected to the data pads corresponding to even numbers. The first and second data shorting bars are used to detect whether or not the data lines exhibit a short circuit by a difference of voltages applied to the data lines.

The data terminal lines 192 and data shorting bars 304 may be formed in the same layer as the data pads 172a. Generally, the data line layer is made of molybdenum (Mo) having a specific resistance of $0.15\Omega/\mu m$, and therefore, inevitably has a large width to prevent line resistance from being high. Accordingly, it is desirable that the data terminal lines and data shorting bars be simultaneously formed with the gate line layer in order to minimize an area occupied by the data terminal lines. In this case, the gate line layer is made of AlNd having a specific resistance of $0.05\Omega/\mu m$.

As stated above, when the data terminal lines and data shorting bars are simultaneously formed with not the data line layer but the gate line layer, the data shorting bars may each have a width of about 50 to about 60 μm, and the six data terminal lines may each have a width of about 170 μm, thereby reducing the sizes of the data shorting bars and data terminal lines.

For reference, reference numeral 500 of FIGS. 6 and 7 denotes a transparent conductive film, which is configured to cover exposed regions of the gate pads 171a and data pads 172a, thereby protecting the gate pads and data pads that are liable to be oxidized in the atmosphere. The transparent conductive film 500 is formed in the same layer as the connection patterns 200. The transparent conductive film and connection patterns are formed in the same layer as the pixel electrodes of the active region, and are made of indium tin oxide (ITO) and indium zinc oxide (IZO).

In the thin film transistor array substrate having the above described configuration, a short circuit between the gate lines and the data lines is detected by applying a predetermined voltage to the gate shorting bars and data shorting bars. That is, after applying a predetermined voltage to the shorting bars that are connected to the lines corresponding to odd numbers and the shorting bars that are connected to the lines corresponding to even numbers, resistance values of the respective lines are measured, so as to detect a short circuit of the lines.

Thereafter, a predetermined voltage is applied to the gate test terminals and data test terminals, to detect whether or not the TFT of each pixel is accurately driven. That is, differently from a prior art method wherein probes are aligned with the respective gate pads and data pads to apply predetermined signals to the gate pads and data pads, according to the present invention, the probes are aligned with the test terminals that are connected to the gate pads and data pads to apply signals required to confirm defects of each pixel. Since the test terminals have a larger size than the gate pads, aligning the probes with the test terminals can reduce the risk of misalignment of the probes.

Here, regions where the gate shorting bars and data shorting bars are formed will be removed in the scribing process, wherein the TFT array substrate and color filter layer array substrate bonded to each other are cut, after applying the predetermined voltage to the shorting bars so as to detect the short circuit of the lines. Hereinafter, the probes are aligned with the test terminals to apply signals required to confirm defects of each pixel according to the present invention. And then, regions where the gate test terminals and data test terminals are formed will be removed in the grinding process, wherein the edges of the TFT array substrate and color filter layer array substrate cut are grinded. Thus, partial regions on the outside of the gate test terminals and data test terminals can be subjected to scribing and grinding processes.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

For example, the number of the gate test terminals and data test terminals are not limited to the above described embodiments, and various modifications and variations thereof can be made in the present invention without departing from the spirit or scope of the inventions.

As apparent from the above description, the thin film transistor array substrate of the present invention has the following effects.

Firstly, instead of directly aligning probes of a test apparatus with gate pads and data pads, according to the present invention, the probes are aligned with gate test terminals and data test terminals, which are additionally provided at the thin film transistor array substrate, to check defects of pixels by applying test signals to the test terminals. This has the effect of eliminating a test defect due to misalignment between the probes and pad electrodes, and achieving an enlargement of the gate test terminals and data test terminals, resulting in a sufficient probe contact margin.

Secondly, in addition to providing a test terminal unit only at a side of a pad unit, according to the present invention, two test terminal units may be provided at opposite sides of the pad unit to apply a test voltage to a single pad electrode. This can minimize the delay of test signals which becomes worse as the distance between the test terminals and pad electrodes increases. As a result, defects of pixels can be more efficiently tested.

What is claimed is:

1. A method of fabricating a thin film transistor array substrate comprising:
    forming thin film transistors and pixel electrodes at respective pixels defined by gate lines and data lines that intersect each other;
    forming a plurality of gate pad units that group a plurality of gate pads extended from the gate lines;
    forming a plurality of data pad units that group a plurality of data pads extended from the data lines;
    forming test terminal units comprising at least one of gate test terminal units or data test terminal units, wherein the gate test terminal units include a plurality of gate test terminals and are provided adjacent to at least one side of the gate pad units to be connected thereto, and the data test terminal units include a plurality of data test terminals and are provided adjacent to at least one side of the data pad units to be connected thereto;
    forming gate terminal lines extended from the respective plurality of gate test terminals on the outside of the plurality of gate pads; and
    forming gate shorting bars provided on the outside of the gate terminal lines and connected to the plurality of gate pads,
    wherein the gate shorting bars each have a width of about 50 to about 60 μm, and the gate terminal lines each have a width of about 170 μm.

2. The method of fabricating a thin film transistor array substrate as set forth in claim 1, wherein the test terminal units comprise both gate test terminal units and data test terminal units.

3. The method of fabricating a thin film transistor array substrate as set forth in claim 1, wherein test signals are applied to the plurality of gate pads via the gate test terminals.

4. The method of fabricating a thin film transistor array substrate as set forth in claim 1, wherein test signals are applied to the plurality of data pads via the data test terminals.

5. The method of fabricating a thin film transistor array substrate as set forth in claim 1, wherein the plurality of gate test terminals are divided into groups such that each group, consisting of a number (n) of gate test terminals (here, letter "n" denotes a natural number more than 1), is connected to an associated one of the plurality of gate pad units.

6. The method of fabricating a thin film transistor array substrate as set forth in claim 1, wherein the plurality of gate test terminals are provided at one side of the respective plurality of gate pad units.

7. The method of fabricating a thin film transistor array substrate as set forth in claim 1, wherein the plurality of gate test terminals include first gate test terminals and second gate test terminals such that the first gate test terminals and the second gate test terminals are provided at opposite sides of the respective plurality of gate pad units.

8. The method of fabricating a thin film transistor array substrate as set forth in claim 7, wherein an (n)th gate test terminal of the first gate test terminals is integrally connected with an (n)th gate test terminal of the second gate test terminals to come into contact with the same gate pads in the plurality of gate pad units as each other (here, letter "n" denotes a natural number more than 1).

9. The method of fabricating a thin film transistor array substrate as set forth in claim 1, wherein the plurality of gate test terminals are provided in the same layer as the gate lines.

10. The method of fabricating a thin film transistor array substrate as set forth in claim 9, wherein the plurality of gate test terminals are made of AlNd.

11. The method of fabricating a thin film transistor array substrate as set forth in claim 1, wherein the plurality of data test terminals are divided into groups such that each group, consisting of a number (f) of data test terminals (here, letter "f" denotes a natural number more than 1), is connected to an associated one of the plurality of data pad units.

12. The method of fabricating a thin film transistor array substrate as set forth in claim 1, wherein the plurality of data test terminals are provided at one side of the respective plurality of data pad units.

13. The method of fabricating a thin film transistor array substrate as set forth in claim 1, wherein the plurality of data test terminals include first data test terminals and second data test terminals such that the first data test terminals and the second data test terminals are provided at opposite sides of the respective plurality of data pad units.

14. The method of fabricating a thin film transistor array substrate as set forth in claim 13, wherein an (f)th data test terminal of the first data test terminals is integrally connected with an (f)th data test terminal of the second data test terminals to come into contact with the same data pads in the plurality of data pad units as each other (here, letter "f" denotes a natural number more than 1).

15. The method of fabricating a thin film transistor array substrate as set forth in claim 1, wherein the plurality of data test terminals are provided in the same layer as the data lines.

16. The method of fabricating a thin film transistor array substrate as set forth in claim 1, wherein the plurality of data test terminals are made of AlNd in the same layer as the gate lines.

17. The method of fabricating a thin film transistor array substrate as set forth in claim 1, wherein the plurality of gate pads are brought into contact with the gate terminal lines by use of connection patterns provided in the same layer as the pixel electrodes.

18. The method of fabricating a thin film transistor array substrate as set forth in claim 1, wherein the gate shorting bars include a first gate shorting bar connected to the plurality of gate pads corresponding to odd numbers, and a second gate shorting bar connected to the plurality of gate pads corresponding to even numbers.

19. The method of fabricating a thin film transistor array substrate as set forth in claim 1, wherein the gate terminal lines and the gate shorting bars are formed in the same layer as the plurality of gate pads.

20. The method of fabricating a thin film transistor array substrate as set forth in claim 1, further comprising:
    forming data terminal lines extended from the respective plurality of data test terminals on the outside of the plurality of data pads.

21. The method of fabricating a thin film transistor array substrate as set forth in claim 20, wherein the plurality of data pads are brought into contact with the data terminal lines by use of connection patterns provided in the same layer as the pixel electrodes.

22. The method of fabricating a thin film transistor array substrate as set forth in claim 20, further comprising:
    forming data shorting bars provided on the outside of the data terminal lines and connected to the plurality of data pads.

23. The method of fabricating a thin film transistor array substrate as set forth in claim 22, wherein the data shorting bars include a first data shorting bar connected to the plurality of data pads corresponding to odd numbers, and a second data shorting bar connected to the plurality of data pads corresponding to even numbers.

24. The method of fabricating a thin film transistor array substrate as set forth in claim 22, wherein the data terminal lines and the data shorting bars are formed in the same layer as the plurality of data pads.

25. The method of fabricating a thin film transistor array substrate as set forth in claim 1, wherein test terminals of the test terminal units have larger size than the gate pads of the plurality of gate pad units or data pads of the plurality of data pad units.

26. A method of fabricating a liquid crystal display device comprising:
    providing a thin film transistor array substrate as set forth in claim 1;
    bonding a color filter layer array substrate with the thin film transistor array substrate;
    cutting the two substrates in a predetermined size;
    grinding edges of the two substrates; and
    applying test signals to at least one of the plurality of gate pads via the gate test terminals or the plurality of data pads via the data test terminals.

27. The method of fabricating a liquid crystal display device as set forth in claim 26, wherein test signals are applied to both the plurality of gate pads via the gate test terminals and the plurality of data pads via the data test terminals.

28. The method of fabricating a liquid crystal display device as set forth in claim 26, wherein the plurality of gate test terminals are provided at one side of the respective plurality of gate pad units.

29. The method of fabricating a liquid crystal display device as set forth in claim 26, wherein the plurality of gate test terminals include first gate test terminals and second gate test terminals such that the first gate test terminals and the second gate test terminals are provided at opposite sides of the respective plurality of gate pad units.

30. The method of fabricating a liquid crystal display device as set forth in claim 26, wherein the plurality of data test terminals are provided at one side of the respective plurality of data pad units.

31. The method of fabricating a liquid crystal display device as set forth in claim 26, wherein the plurality of data test terminals include first data test terminals and second data test terminals such that the first data test terminals and the second data test terminals are provided at opposite sides of the respective plurality of data pad units.

32. The method of fabricating a liquid crystal display device as set forth in claim 26, further comprising:
    forming gate terminal lines extended from the respective plurality of gate test terminals on the outside of the plurality of gate pads.

33. The method of fabricating a liquid crystal display device as set forth in claim 32, wherein the plurality of gate pads are brought into contact with the gate terminal lines by use of connection patterns provided in the same layer as the pixel electrodes.

34. The method of fabricating a liquid crystal display device as set forth in claim 32, further comprising:
    forming gate shorting bars provided on the outside of the gate terminal lines and connected to the plurality of gate pads.

35. The method of fabricating a liquid crystal display device as set forth in claim 34, wherein a region where the gate shorting bars are formed is removed in the step of cutting the two substrates in a predetermined size.

36. The method of fabricating a liquid crystal display device as set forth in claim 35, wherein a region where the gate test terminal lines are formed is removed in the step of grinding the edges of the two substrates, after applying test signals to at least one of the plurality of gate pads via the gate test terminals.

37. The method of a liquid crystal display device as set forth in claim 26, further comprising:
    forming data terminal lines extended from the respective plurality of data test terminals on the outside of the plurality of data pads.

38. The method of fabricating a liquid crystal display device as set forth in claim 37, wherein the plurality of data pads are brought into contact with the data terminal lines by use of connection patterns provided in the same layer as the pixel electrodes.

39. The method of fabricating a liquid crystal display device as set forth in claim 37, further comprising:

forming data shorting bars provided on the outside of the data terminal lines and connected to the plurality of data pads.

40. The method of fabricating a liquid crystal display device as set forth in claim 39, wherein a region where the data shorting bars are formed is removed in the step of cutting the two substrates in a predetermined size.

41. The method of fabricating a liquid crystal display device as set forth in claim 40, wherein a region where the data test terminal lines are formed is removed in the step of grinding the edges of the two substrates, after applying test signals to at least one of the plurality of data pads via the data test terminals.

42. The method of fabricating a liquid crystal display device as set forth in claim 26, wherein test terminals of the test terminal units have larger size than the gate pads of the plurality of gate pad units or data pads of the plurality of data pad units.

* * * * *